(12) United States Patent
Wawchuk

(10) Patent No.: US 12,264,765 B2
(45) Date of Patent: Apr. 1, 2025

(54) COUPLING DEVICE FOR FLUID LINES

(71) Applicant: Richard Wawchuk, Lloydminster (CA)

(72) Inventor: Richard Wawchuk, Lloydminster (CA)

( * ) Notice: Subject to any disclaimer, the term of this patent is extended or adjusted under 35 U.S.C. 154(b) by 0 days.

(21) Appl. No.: 18/489,192

(22) Filed: Oct. 18, 2023

(65) Prior Publication Data
US 2024/0133499 A1 Apr. 25, 2024
US 2024/0229999 A9 Jul. 11, 2024

Related U.S. Application Data

(60) Provisional application No. 63/418,311, filed on Oct. 21, 2022.

(51) Int. Cl.
*F16L 37/18* (2006.01)
*F16L 3/12* (2006.01)
*F16L 37/113* (2006.01)

(52) U.S. Cl.
CPC ............ *F16L 37/18* (2013.01); *F16L 3/1203* (2013.01); *F16L 37/113* (2013.01); *F16L 2201/20* (2013.01)

(58) Field of Classification Search
CPC ....... F16L 37/18; F16L 37/103; F16L 37/113; F16L 37/24; F16L 37/244; F16L 37/252
USPC .................................... 285/312, 38
See application file for complete search history.

(56) References Cited

U.S. PATENT DOCUMENTS

| | | | |
|---|---|---|---|
| 2,033,142 A * | 3/1936 | Lewis | F16L 37/18 285/374 |
| 6,089,619 A | 7/2000 | Goda | |
| 7,988,200 B2 | 8/2011 | Krywitsky | |
| 9,347,593 B2 | 5/2016 | Wawchuk | |
| 10,443,774 B1 * | 10/2019 | Hartman | F16L 37/18 |
| 2011/0221188 A1 * | 9/2011 | Fuller | F16L 35/00 285/312 |
| 2013/0320663 A1 * | 12/2013 | Wawchuk | F16L 37/18 285/38 |
| 2014/0183860 A1 * | 7/2014 | Stead | F16L 37/18 285/330 |
| 2015/0354742 A1 * | 12/2015 | Holtby | F16L 21/08 285/308 |

(Continued)

FOREIGN PATENT DOCUMENTS

| | | |
|---|---|---|
| CA | 2778667 A1 | 11/2013 |
| CA | 2778667 C | 2/2017 |

(Continued)

*Primary Examiner* — Aaron M Dunwoody
(74) *Attorney, Agent, or Firm* — Bennett Jones LLP

(57) ABSTRACT

A coupling device for fluid lines includes a female part having an annular wall with an aperture, a locking arm with a cam, and a male part having an annular wall with an outside surface with a circumferential groove and defining a longitudinal channel extending into the groove. The male part can be inserted into and rotated within the female part. The locking arm has a cam, and can be rotated between a locked position in which the cam is in a locked position and an unlocked position in which the cam is in an unlocked position. When the cam is in either the locked or unlocked position, the cam engages the groove to retain the male part within the female part, unless the male part is rotationally positioned relative to the female part such that cam is aligned with the channel, in which case the male part is releasable from the female part.

7 Claims, 2 Drawing Sheets

(56) References Cited

U.S. PATENT DOCUMENTS

2024/0133499 A1  4/2024  Wawchuk

FOREIGN PATENT DOCUMENTS

GB   2211258 A   6/1989
WO   2011139152 A1   11/2011

* cited by examiner

COUPLING DEVICE FOR FLUID LINES

CROSS-REFERENCE

The present application claims the priority benefit of U.S. Provisional Patent Application No. 63/418,311, filed on Oct. 21, 2022, the entire contents of which are incorporated herein by reference.

FIELD OF THE INVENTION

The present invention relates to a coupling device for fluid lines.

BACKGROUND OF THE INVENTION

Cam-and-groove couplings are used to connect fluid lines. A conventional cam-and-groove coupling consists of a female part, a male part and at least one locking arm. The female part and male part are annular walls. The male part is shaped to slidingly insert into and withdraw from the female part and has a circumferential groove formed on its outside surface. The female part has a pivoting locking arm that has a cam shaped to engage the groove of the male part. When the male part is inside the female part, the locking arm is rotatable between a locked position in which the cam protrudes through an aperture and engages the groove to lock the male part to the female part, and an unlocked position in which the cam is substantially withdrawn and thus permits the male and female parts to be separated.

When the locking arm of a conventional cam-and-groove coupling is in the unlocked position, the male part may accidentally withdraw from the female part because the male part is retained in the female part only by relatively low friction between the two parts. Residual fluid pressure in the fluid lines or the weight of the fluid lines when they are inclined or unsupported can easily cause separation. This separation can result in fluid spillage, which is especially undesirable if the fluid is hazardous or contaminating to the environment. Further, if the fluid pressure is significant, the separation may occur violently and pose a risk of bodily injury or property damage.

SUMMARY OF THE INVENTION

In one aspect, the present invention provides a coupling device for coupling a first fluid line to a second fluid line, said device comprising:
 (a) a female part comprising:
   (i) a line end for sealably connecting to the first fluid line; and
   (ii) a female mating end comprising a cylindrical annular wall with an aperture;
   (iii) at least one locking arm comprising a cam, said arm rotatably connected to the female mating end and rotatable between a locked position wherein the cam protrudes through the aperture to a locked position, and an unlocked position wherein the cam protrudes through the aperture to an unlocked position;
 (b) a male part comprising:
   (i) a line end for sealably connecting to the second fluid line; and
   (ii) a male mating end comprising a cylindrical annular wall, comprising an outside surface with a circumferentially formed groove and defining a longitudinally formed channel extending from the end of the male mating end into the groove;
   (iii) a safety stop formed in the intersection of the channel and the groove;
 wherein the at least one locking arm cannot be rotated to the locked position when the cam is aligned with the safety stop, and the cam in either the locked or unlocked position engages the male cylindrical annular wall within the groove to retain the male mating end in the female mating end, unless the male part is rotationally positioned relative to the female part such that cam is aligned with the channel, in which case the male part is releasable from the female part.

In another aspect, the invention may comprise a male part of a coupling device for coupling a first fluid line to a second fluid line, for engaging a female part comprising a female mating end comprising a cylindrical annular wall with an aperture; and at least one locking arm comprising a cam, said arm rotatably connected to the female mating end and rotatable between a locked position wherein the cam protrudes through the aperture to a locked position, and an unlocked position wherein the cam protrudes through the aperture to an unlocked position;
 wherein the male part comprises:
   (i) a line end for sealably connecting to the second fluid line; and
   (ii) a male mating end comprising a cylindrical annular wall, comprising an outside surface with a circumferentially formed groove and defining a longitudinally formed channel extending from the end of the male mating end into the groove;
   (iii) a safety stop formed in the intersection of the channel and the groove;
 and wherein the safety stop physically prevents the locking arm from moving to its locked position, and the cam in either the locked or unlocked position engages the male cylindrical annular wall within the groove to retain the male mating end in the female mating end, unless the male part is rotationally positioned relative to the female part such that cam is aligned with the channel, in which case the male part is releasable from the female part.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. Any dimension shown in the drawings are exemplary only, and are not intended to be limiting. The drawings are briefly described as follows.

DETAILED DESCRIPTION

This disclosure provides a coupling device for fluid lines. The following is a detailed description of a preferred embodiment.

In this disclosure, all terms not defined herein have their common art-recognized meanings. As used herein, "fluid line" refers to any vessel for transferring a substance in solid, liquid, or gas state, and includes, without limiting the generality of the foregoing, a pipe, a hose, or a spigot.

In some embodiments, the coupling device is an improved version of the coupling device described in U.S. Pat. No. 9,347,593, the entire contents of which are incorporated herein, by reference.

Referring to the Figures, a coupling device comprises a female part (10), and a male part (20). The female part (10) and male part (20) are manufactured from a material that is chemically resistant to the substance to be transferred in the fluid line, and that has sufficient rigidity and strength to resist deformation and damage with repeated use. Suitable materials may include various plastics or polymers, or iron-carbon alloyed steels such as stainless steel. Suitable manufacturing methods may include forging, machining, casting and extrusion.

Figure 1:
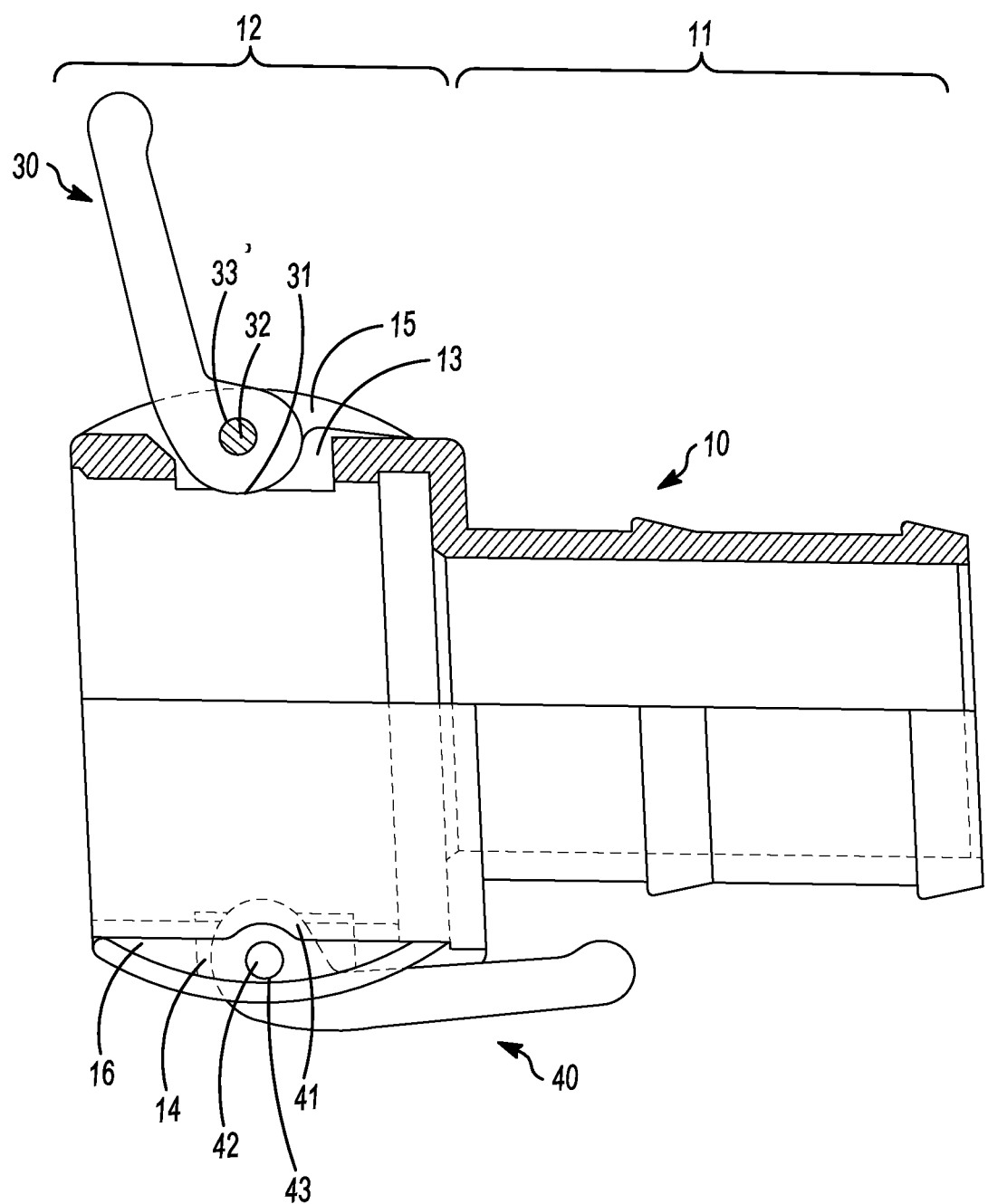
FIG. 1 is a side half-sectional view of a female part with two locking arms.

Referring to FIG. 1, the female part (10) has a line end (11), a female mating end (12), a first locking arm (30), and an optional second locking arm (40). In other embodiments, the number of locking arms (40) may differ, so long as there is at least one locking arm (30). The line end (11) is configured to connect and seal to an end of a fluid line using connectors known in the art such as, but not limited to, a barbed connection or a threaded connection (not shown). The female mating end (12) includes a cylindrical annular wall with locking arm apertures (13, 14).

The locking arms (30, 40) each have a cam (31, 41), and are rotatably connected to the female mating end (12) by pins (32, 42) inserted through holes (33, 43) formed in the locking arms (30, 40) and holes formed in thickened portions (15, 16) of the female mating end (12). The precise manner in which the locking arms (30, 40) are rotatably connected to the female part (10) is not essential.

The locking arms (30, 40) are rotatable between a locked position and an unlocked position. Referring to FIG. 1, the locking arm (40) is shown in the locked position and the locking arm (30) is shown in the unlocked position. When a locking arm (30, 40) is in the locked position, its cam (31, 41) protrudes through the aperture (13, 14) to a locked position, and when the locking arm (30, 40) is in the unlocked position, the cam (31, 41) is retracted to an unlocked position. When a cam (31, 41) is in the unlocked position, it may still protrude through the aperture (13, 14), but to a lesser extent than when the cam (31, 41) is in the locked position.

Figure 2:
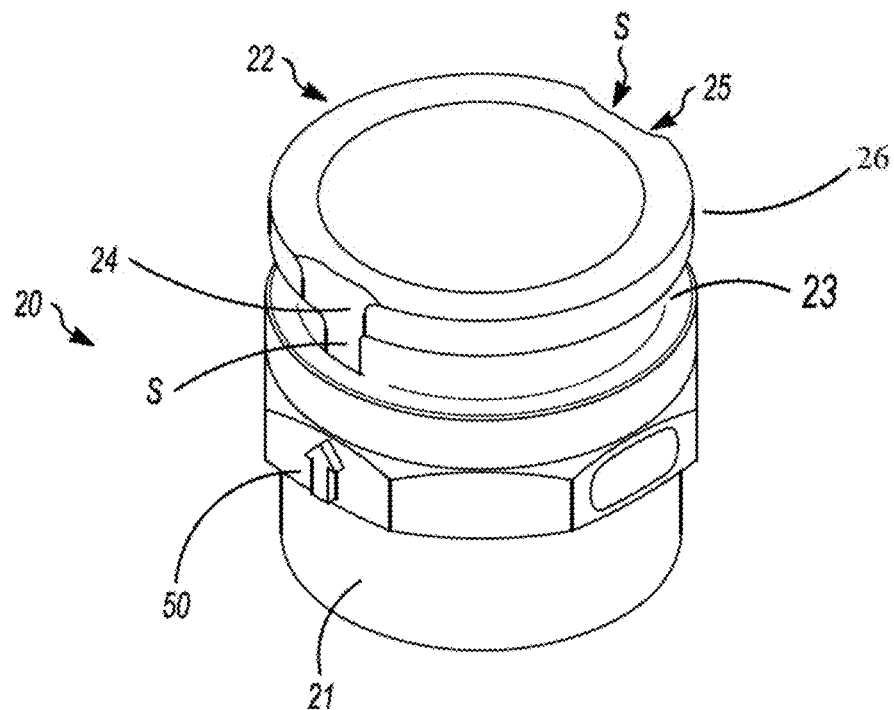
FIG. 2 is a perspective view of a male part.
Figure 3:
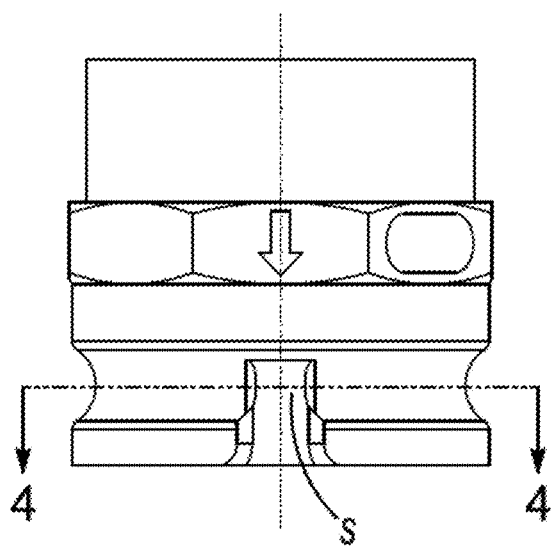
FIG. 3 is an side plan view of the male part shown in FIG. 2.
Figure 4:
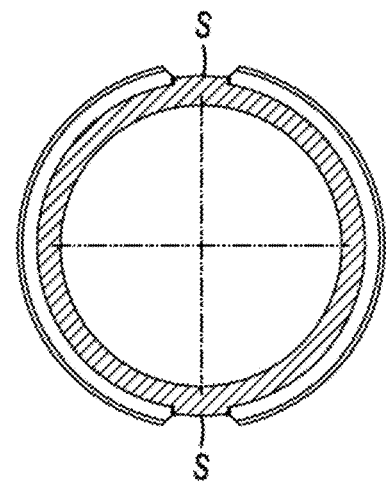
FIG. 4 is a cross-section of the male part, along line C-C in FIG. 3.

Referring to FIGS. 2 and 3, the male part (20) has a line end (21) and a male mating end (22). The line end (21) is configured to connect and seal to an end of a fluid line using connectors known in the art such as, but not limited to, a threaded connection (not shown). The male mating end (22) includes a cylindrical annular wall shaped to sealably and slidingly insert into and withdraw from the female mating end (12) and rotate about its cylindrical axis relative to and within the female mating end (12). The male mating end (22) has an outside surface (26) with a circumferentially formed groove (23) and defining longitudinal channels (24, 25) which correspond with the locking arms (30, 40) of the female part. Thus, the male mating end (22) defines a first longitudinal channel (24) and an optional second longitudinal channel (25), preferably disposed opposite the first channel (24). The channels (24, 25) extend from the end of the male mating end (22) into the groove (23).

The groove (23) is positioned on the male mating end (22) so that it is exposed by the apertures (13, 14) when the male mating end (22) is fully inserted into the female mating end (12). The groove (23) is shaped to receive the cams (31, 41) and allow the cams to rotate between their locked position and unlocked position. The groove (23) is also shaped so that the cams (31, 41) can slide circumferentially along the groove (23) when the male mating end (22) is rotated within the female mating end (12).

The channels (24, 25) are positioned so that their angular separation corresponds to the angular spacing between the apertures (13, 14). In this manner, the apertures (13, 14) simultaneously expose both channels (24, 25) when the male mating end (22) is rotated into such a position. For example, in FIGS. 1 to 3, both the angular spacing of the channels (24, 25) and the apertures (13, 14) is approximately 180 degrees, but a different angular spacing may be selected. The channels (24, 25) are shaped to receive and allow the cams (31, 41) to slide longitudinally along the channels (24, 25) when the male mating end (22) is inserted into or withdrawn from the female mating end (12).

A safety stop (S) is positioned in the intersection of the channels (24, 25) and the circumferential groove (23), and is a significant safety feature of the device. The safety stop (S) may comprise a raised element (i.e. a small protrusion) which permits the cams to be inserted into the groove (23) when in an unlocked position, but prevents the cams from being locked while aligned with the channels (24, 25). In other words, the safety stop is intermediate the level of the outer surface (26) and the depth of the groove (23). As such, the safety stop still permits the cam to move into the groove (23) or the channel (24 or 25) while the locking arm and cam are in the unlocked position. However, the locking arm and cam cannot be locked while the cam is positioned over top of the safety stop.

The operation of the coupling device is now described. The female part (10) and the male part (20) are brought together to be coupled. The locking arms (30, 40) are both rotated to their unlocked positions. The male part (20) and the female part (10) are positioned so that the channels (24, 25) align with the cams (31, 41). In this configuration, the male mating end (22) is inserted into the female mating end (12), with the cams (31, 41) sliding longitudinally along the channels (24, 25) and into the groove (23).

Once the male mating end (22) is fully inserted into the female mating end (12), the male part is rotated relative to the female part (10), with the cams (31, 41) sliding circumferentially along the groove (23) and so that the channels (24, 25) are no longer aligned with the cams (31, 41). The safety stop (S) prevents the cams from being locked while aligned with the channels (24, 25).

The locking arms (30, 40) are then both rotated to the locked position so that the cams (31, 41) are also in their locked position, where the cams (31, 41) bind against the annular wall within the groove (23) and lock the male mating end (20) in the female mating end (10).

The safety stops (S) are an effective safety measure preventing a possible unintended decoupling. If the cams are aligned with the channels (24, 25), the male part (20) and the female part (10) may easily come apart when the cams are unlocked, particularly if the fluid lines are under pressure. If high pressure exists, the two parts may come apart explosively, creating an injury or accident risk.

When the two parts are to be disconnected, the locking arms (30, 40) are both rotated to their unlocked position so that the cams (31, 41) are also in their unlocked position. In this configuration, the cams (31, 41) engage the annular wall within the groove (23) to retain the male mating end (22) within in the female mating end (12), and thereby prevent the male mating end (22) against accidentally separating from the female mating end (12). In order to withdraw the male mating end (22) from the female mating end (12), the male part (20) is rotated relative to the female part (10), with the cams (31, 41) sliding circumferentially within the groove (23) until the cams (31, 41) are aligned with the safety stops (S) and channels (24, 25).

The male mating end (22) may then be withdrawn from the female mating end (12) with the cams (31, 41) sliding out of the groove (23) and longitudinally along the channels (24, 25) until separation of the male mating end (22) and the female mating end (12) is complete.

One or both of the male part or the female part may have user visible markings, for example an arrow (50), to help a user visualize when the cam is aligned with the channel or when the cam is not aligned with the channel.

Although the present invention has been described with reference to specific embodiments, they are intended to be illustrative only and not limit the scope of the claims, which should be given the broadest interpretation consistent with the description as a whole.

What is claimed:

1. A coupling device for coupling a first fluid line to a second fluid line, said device comprising:
    (a) a female part comprising:
        (i) a line end for sealably connecting to the first fluid line; and
        (ii) a female mating end comprising a cylindrical annular wall with an aperture;
        (iii) at least one locking arm comprising a cam, said arm rotatably connected to the female mating end and rotatable between a locked position wherein the cam protrudes through the aperture to a locked position, and an unlocked position wherein the cam protrudes through the aperture to an unlocked position;
    (b) a male part comprising:
        (i) a line end for sealably connecting to the second fluid line; and
        (ii) a male mating end comprising a cylindrical annular wall, comprising an outside surface with a circumferentially formed groove and defining a longitudinally formed channel extending from the end of the male mating end into the groove, the groove intersecting the channel;
        (iii) a safety stop formed in the intersection of the channel and the groove;
    wherein the at least one locking arm cannot be rotated to the locked position when the cam is aligned with the safety stop, and the cam in either the locked or unlocked position engages the male cylindrical annular wall within the groove to retain the male mating end in the female mating end, unless the male part is rotationally positioned relative to the female part such that cam is aligned with the channel, in which case the male part is releasable from the female part.

2. The coupling device of claim 1 wherein the female part has two locking arms having an angular separation, the male mating end has two channels having an angular separation, and the angular separation between the two locking arms is equal to the angular separation between the two channels.

3. The coupling device of claim 2 wherein the angular separation between the two locking arms is about 180°.

4. The coupling device of claim 1 further comprising markings on one or both of the male part or the female part to indicate when the at least one locking arm is aligned with the channel or when the at least one locking arm is not aligned with the channel.

5. The coupling device of claim 1 wherein the safety stop is a raised element.

6. A male part of a coupling device for coupling a first fluid line to a second fluid line, for engaging a female part comprising a female mating end comprising a cylindrical annular wall with an aperture; and at least one locking arm comprising a cam, said arm rotatably connected to the female mating end and rotatable between a locked position wherein the cam protrudes through the aperture to a locked position, and an unlocked position wherein the cam protrudes through the aperture to an unlocked position;
    wherein the male part comprises:
        (i) a line end for sealably connecting to the second fluid line; and
        (ii) a male mating end comprising a cylindrical annular wall, comprising an outside surface with a circumferentially formed groove and defining a longitudinally formed channel extending from the end of the male mating end into the groove, the groove intersecting the channel;
        (iii) a safety stop formed in the intersection of the channel and the groove;
    and wherein the safety stop physically prevents the locking arm from moving to the locked position, and the cam in either the locked or unlocked position engages the male cylindrical annular wall within the groove to retain the male mating end in the female mating end, unless the male part is rotationally positioned relative to the female part such that cam is aligned with the channel, in which case the male part is releasable from the female part.

7. The male part of claim 6 wherein the safety stop is a raised element 1.

* * * * *